July 21, 1931. A. A. KRAMER 1,815,625
VEHICLE TANK
Filed April 13, 1927 3 Sheets-Sheet 1
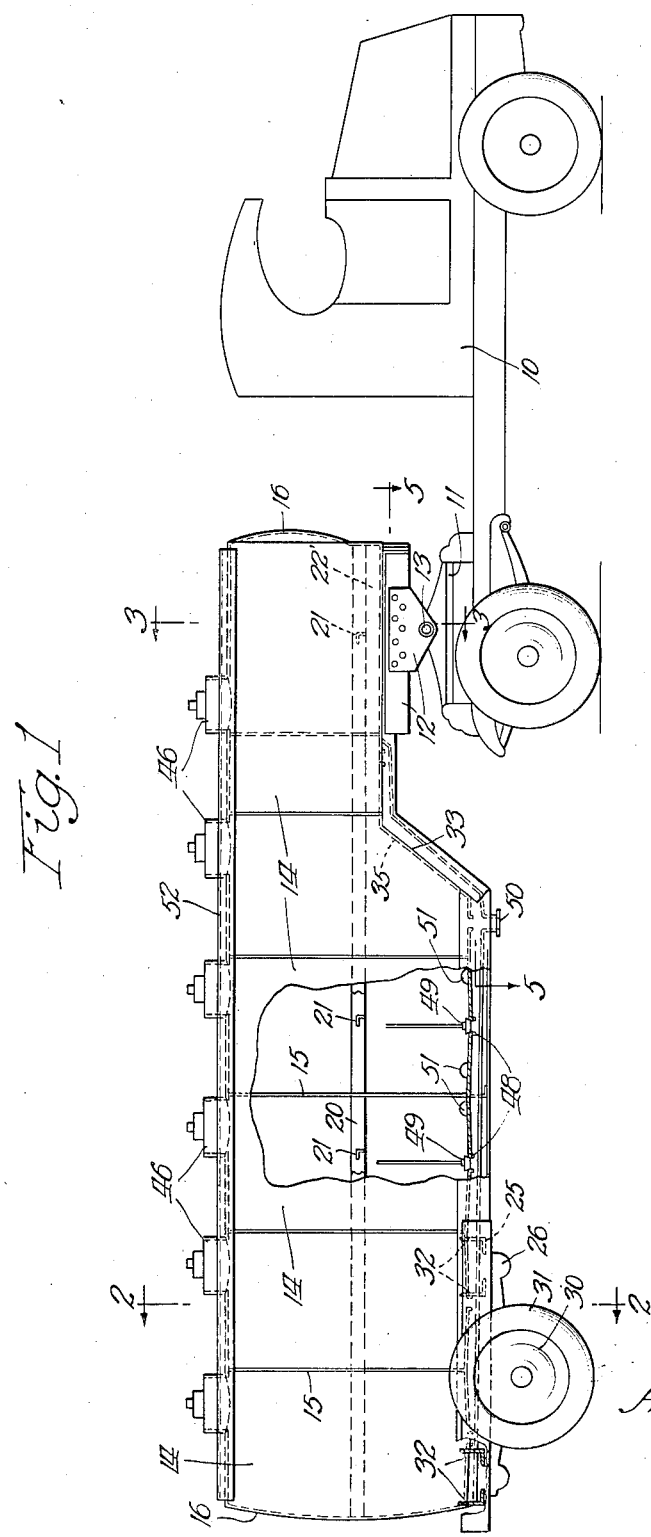
Inventor
Andrew A. Kramer
Alfred R. Fuchs
Atty.

July 21, 1931.   A. A. KRAMER   1,815,625
VEHICLE TANK
Filed April 13, 1927   3 Sheets-Sheet 2
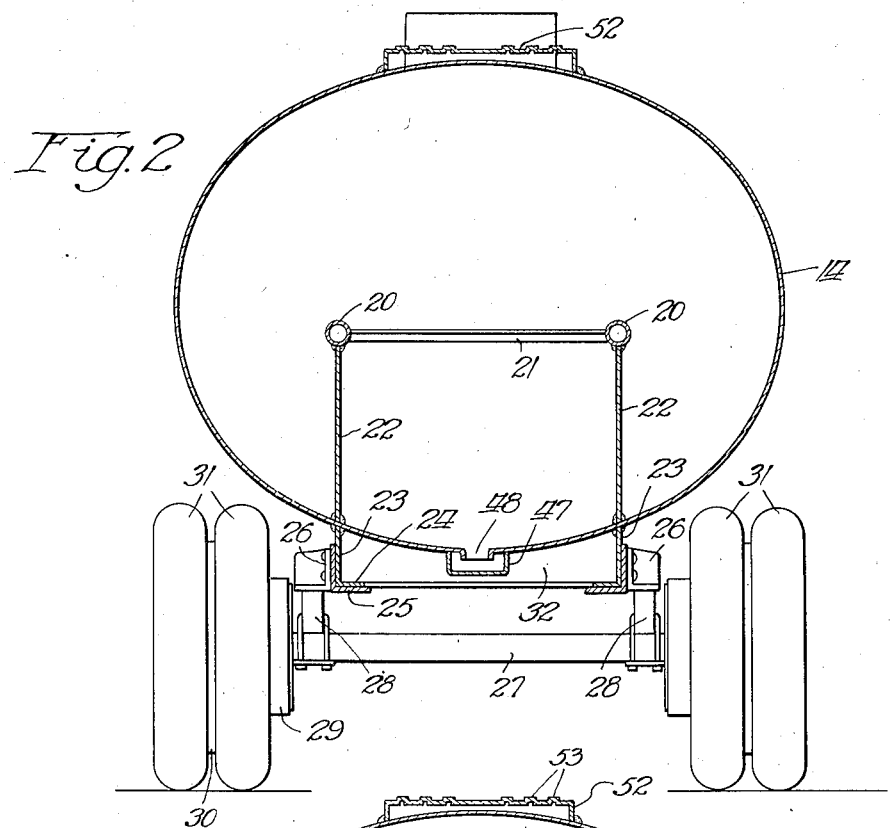
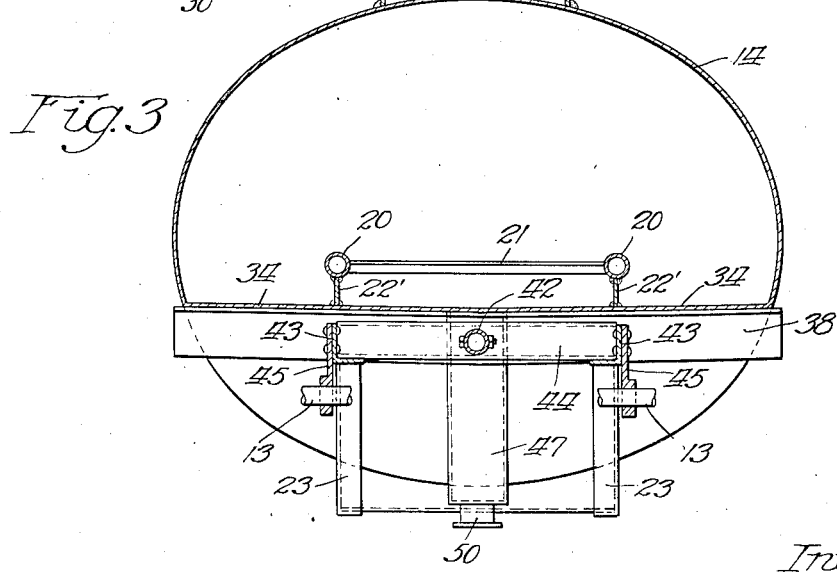
Inventor
Andrew A. Kramer
Alfred R. Funne
Atty.

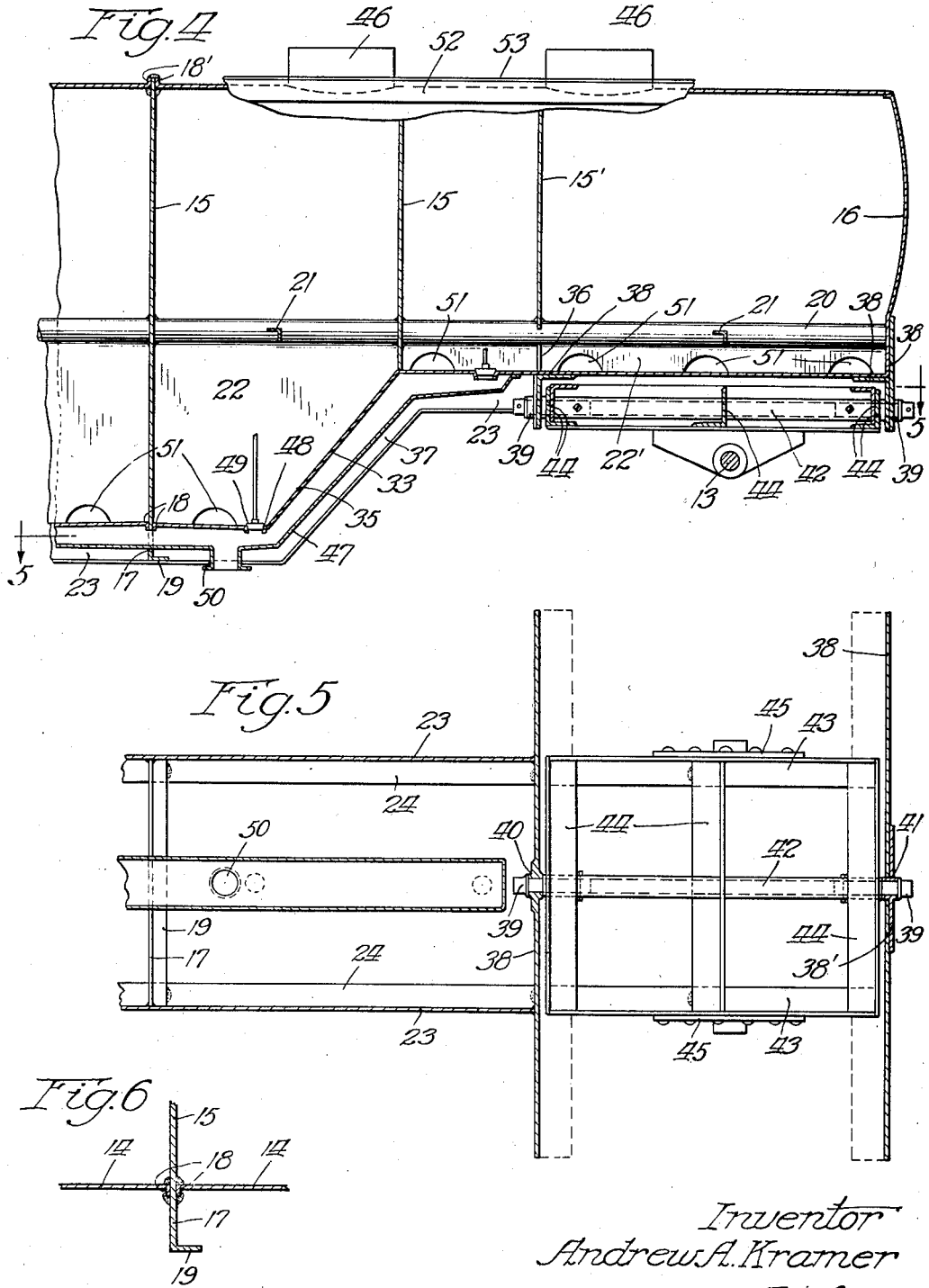

Patented July 21, 1931

1,815,625

UNITED STATES PATENT OFFICE

ANDREW A. KRAMER, OF KANSAS CITY, MISSOURI

VEHICLE TANK

Application filed April 13, 1927. Serial No. 183,536.

My invention relates to tanks and more particularly to vehicle tanks.

It is a purpose of my invention to provide a vehicle tank so constructed that the framework ordinarily provided for the vehicle may be entirely dispensed with, the frame being integral with the tank. This is particularly desirable when the tank is mounted on a trailer, the trailer framework being thus dispensed with, and the front and rear set of wheels, in the case of a four-wheeled trailer, or the fifth wheel and the rear wheels, in the case of a semi-trailer, being connected by the tank structure itself.

The above mentioned purpose is preferably accomplished by so bracing the tank that the same is capable of supporting itself under road conditions without the aid of a vehicle framework. The bracing means forms an integral part of the tank, and comprises internal and external bracing means co-operating to form a framework. Said bracing means comprises longitudinally extending members within the tank in the form of vertically extending platelike members, which may be called shear plates. Said bracing means also preferably comprises longitudinally extending tubular members, which may serve as draft members under certain conditions, and which may be called draft tubes. The shear plates preferably extend from the draft tubes to the shell of the tank, thus forming, in effect, the webs of longitudinally extending I-beams. Furthermore said bracing means preferably comprises longitudinally extending bracing members externally of and underneath the tank, said bracing members being preferably joined to downwardly extending portions of transverse head portions and partitions of said tank to form a framework therewith. Said draft tubes and shear plates are also preferably joined to said partitions and head portions to thus form a transversely and longitudinally braced framework located partially internally of and partially externally of said tank. It is very desirable to have the external longitudinal braces and the shear plates in vertical alignment, whenever the proportions of the tank permit such arrangement.

One of the important advantages of such a tank construction is that it permits standardization of the same. Where tanks have to be adapted to the various models of trucks and trailers of different manufacturers, it is practically impossible to make a standard construction of tank for the different capacities. Furthermore due to the ommission of the trailer framework the weight of the vehicle is correspondingly reduced, thus making it possible to provide a tank vehicle of larger capacity for a given weight limit.

The draft tubes and also the shear plates, furthermore, strengthen the heads and partitions in the tank against breathing. Said draft tubes may also serve as hose receptacles and the shear plates serve as surge plates.

It is another important purpose of the invention to provide a tank vehicle that has a low center of gravity, particularly when loaded, thus overcoming a common difficulty now existing in tank vehicles; their tendency to overturn when making turns at a relatively high rate of speed. This is accomplished by providing an offset tank construction, with a portion thereof projecting below the level of a supported end thereof. In the construction shown in the drawings, particularly adapted for use as a semi-trailer in conjunction with a tractor, the forward end of the tank is cut off on the under side thereof, so as to project the main body portion of the tank below the level of said forward end. This feature of the construction is very important as it provides for safety in handling highly explosive liquids such as gasoline, and similar liquid fuels.

It is also a purpose of my invention to provide my improved bracing means, constituting a framework integral with the tank, in an offset vehicle tank of the above mentioned construction, and to provide offsets in the internal and external bracing means to provide what constitutes substantially an integral drop frame trailer framework and tank. Obviously the various features set forth above may be used in a tank for the bulk handling of liquid or the handling of liquid in separate compartments in the tank.

Other objects and advantages of the invention will appear as the description of the drawings proceeds. I desire to have it understood, however, that I do not intend to limit myself to the details of construction shown or described, but that I intend to include as part of my invention all such obvious changes and modifications as would occur to a person skilled in this art and as would fall within the scope of the claims.

In the drawings:

Fig. 1 is a view partly in side elevation and partly in section of my improved vehicle tank, showing the same associated with a tractor vehicle and forming a semi-trailer.

Fig. 2 is a section thereof taken on the line 2—2 of Fig. 1, but on a larger scale.

Fig. 3 is a similar section taken on the line 3—3 of Fig. 1.

Fig. 4 is a fragmentary longitudinal sectional view of the forward end of the tank.

Fig. 5 is a section taken on the line 5—5 of Fig. 4 and

Fig. 6 is a fragmentary detail sectional view.

Referring in detail to the drawings, in Fig. 1 my improved vehicle tank construction is shown, associated with a pulling vehicle or tractor 10 which is provided with a fifth wheel element 11, which may be of any desired construction. The fifth wheel element 11 is usually associated with a co-operating fifth wheel element 12, being connected therewith by means of a transverse horizontal shaft 13.

My improved vehicle tank comprises a shell portion made up of shell sections 14 which are preferably curved as shown in Fig. 2. Said tank further comprises transversely extending sheets, certain thereof constituting partition members 15 and the end ones forming the heads 16. The heads 16 are dished so as to have a slight concavity in order to strengthen the same. The partition members 15 and heads 16 are provided with extended portions 17, and the shell sections 14 are flanged outwardly as indicated at 18 and welded to said partition and head members. The lower edges of the extensions 17 are preferably provided with flanges 19 to stiffen the same.

Mounted within the tank and extending through the same from end to end thereof are the tubular members 20. A pair thereof is shown, but obviously any desired number thereof can be used. Said tubular members 20 extend through the partitions 15 and through the heads 16 and are welded thereto, thus being substantially integral therewith. Said tubular members serve to take the pulling strain, particularly if an additional vehicle is coupled to the rear of the tank vehicle, and may accordingly be referred to as draft tubes. Said tubular members 20 are further provided with transverse braces 21, shown as being angles and being preferably welded thereto.

Said tubular members 20 serve as longitudinally extending bracing and stiffening members constituting a portion of an integral vehicle framework partially within and partially outside the body of the tank. The internal bracing means constituting a portion of said integral framework furthermore comprises the substantially vertically extending plate-like members 22, which extend from the shell sections 14 to the tubular members 20, and which are welded to both the shell portion and the tubes, so as to be substantially integral therewith. The platelike members 22, which serve as shear plates, are also welded to the partition members 15 and the heads 16.

The external portion of the framework comprises the extended portions 17 of the partitions and heads and the longitudinally extending braces 23 or skirts, connecting the extended portions 17 and preferably welded thereto. The members 23 are preferably provided with flanges 24 on the lower edges thereof.

The members 20, 15, 16, 17, 22 and 23, thus form a vehicle framework made up of longitudinal members and cross members integral with the tank, and located partially internally of and partially externally of said tank. In order to strengthen the framework further adjacent the rear end thereof longitudinally extending angles 25 are welded to the members 23. The spring shackle brackets 26 are secured directly to the framework described above and the real axle 27 is secured to the springs 28 in the usual manner. Brake drums 29 are provided on said rear axle and said axle carries the usual wheels 30, which may be provided with paired tread members 31 if desired. In order to additionally strengthen the framework at the points where the same is supported by the rear, wheeled, supporting means described above the transversely extending paired angle members 32 are preferably provided above the brackets 26.

In the embodiment of the invention shown in the drawings, the tank body is offset as indicated at 33 to provide for a lower center of gravity for the load than would be otherwise possible, due to the elevation of the fifth wheel member 11 on the tractor vehicle 10. The shell portion of the tank, is accordingly cut away at the lower side thereof adjacent the forward end of the same, and instead of being curved throughout its circumference, as shown in Fig. 2, the same is provided with a bottom having flat portions 34 sloping toward a central point to a slight extent to provide for substantially complete drainage of the tank. The offset portion preferably extends diagonally at 33 from the flattened portions 34 to the curved bottom of the depressed portion, or main body portion of the tank. In order to provide the desired strength in a tank of this nature, the bracing means previously described is provided, and said bracing means is offset to correspond with the offset in the shell of the tank. Thus the plates 22 are cut away on a diagonal as indicated at 35 to correspond to the inclined portion 33 of the tank, and the forward end portions 22' are reduced in width as shown in Fig. 2. The tubes 20, are, however, preferably straight. In order to further strengthen the frame and the tank at the forward supported end thereof a cross partition member 15' having an opening 36 therein is provided, said members 15' being welded to the members 20, 22 and 14. The external bracing means are also offset to correspond with the offset in the tank body, the members 23 having obliquely extending offsets 37 therein, said members 23 being welded to the body of the tank, at their upper edges.

Welded to the forward upwardly offset bottom portion of the tank are the transversely extending angles 38, a reinforcing plate 38' being also welded to one angle 38 and to the head 16. The longitudinally extending shaftlike members 39, are journaled in bearings 40 and 41 in the angles 38 and plate 38', said shaftlike members being secured in the tubular member 42 welded in fixed position in a framework having the longitudinal members 43 and cross members 44, through which said shaftlike members extend. Secured to the members 43 are the depending brackets 45 having bearings for the cross shaft 13. Thus the framework and the depending brackets form the co-operating fifth wheel element 12 referred to above. It will be noted that by means of the arrangement described above a substantially universal connection is provided between the tractor vehicle and the front end of the tank, said tank being adapted to pivot either about the axis of the member 13 or the axis of the member 39 at its forward end. Thus any unevenness in the road is compensated for without placing any internal strains on the tank.

Any desired means for filling and emptying the tank may be provided. In the drawings the filling means comprises the dome-like members 46, which are of a well known type. While a tank such as that described above may be provided with discharge means whereby the liquid in the different compartments may be discharged either independently or in a bulk load, the means shown is for the handling of bulk loads, and comprises a tunnel-like conduit, channel shaped in cross section, indicated by the numeral 47, secured to the underside of the tank and following the contour thereof lengthwise of the tank. Discharge openings 48 are provided in the bottom of the tank, at least one for each section between the partitions 15 and heads 16, and these are controlled by means of valves 49 automatic in operation to close the openings in case of fire and forming the subject matter of another application. The discharge conduit 47 may be provided with a discharge opening at any desired point, such as indicated at 50 in the drawings. In order to provide for the passage of liquid from one side to the other of the plates 22 openings 51 are provided therein, said plates 22 thus serving not only as shear plates, but also as surge plates.

It will also be noted that the plates 22, the tubular members 20 and the shell portion to which the plates 22 are fastened provide substantially an I-beam like formation running lengthwise of the tank from end to end thereof. The extensions 17 are, of course, cut away to accommodate the conduit 47. The tubular members 20 may be open on the ends thereof to serve as hose receptacles.

If desired, a runway or walkway 52 may be provided extending lengthwise along the top of the tank, said walkway being provided with projections 53 to roughen the same. Said walkway is preferably welded to the tank at 54 and to the dome members at the points of contact therewith. Said walkway thus acts not only as a means of safe footing on top of the tank, but also acts as a brace or stiffening member to resist compression strains lengthwise of the tank.

Having thus described my invention, what I desire to claim and secure by United States Letters Patent is:

1. The combination with a vehicle tank having spaced supports of longitudinally extending tubular bracing means within said tank extending from end to end thereof over said supports and having open ends whereby the same serve as hose receptacles.

2. In a vehicle tank, a shell portion and internal bracing means therefor comprising longitudinally extending platelike members secured along one edge thereof to said shell portion and stiffening means secured to the opposite edge thereof.

3. In a vehicle tank, a shell portion and internal bracing means therefor comprising longitudinally extending platelike members secured along one edge thereof to said shell portion and tubular stiffening means secured to the opposite edge thereof.

4. In a vehicle tank, a shell portion, longitudinally extending tubular bracing means therein and substantially vertically extending longitudinal web portions connecting said tubular means and said shell portion.

5. In a vehicle tank having an offset therein, integral bracing means comprising longitudinally extending internal offset members co-operating with the body of said tank to form offset I-beam-like members running lengthwise thereof.

6. In a vehicle tank, a shell portion having an offset therein and internal bracing means therefor comprising longitudinally extending platelike members having one edge thereof provided with offsets and secured to said shell portion.

7. In a vehicle tank, a shell portion having an offset therein and internal bracing means therefor comprising longitudinally extending platelike members having one edge thereof provided with offsets and secured to said shell portion and longitudinal tubular bracing members secured to the opposite edge thereof.

8. An offset tank having internal bracing means and external bracing means integral with said tank, said means being offset and co-operating with said tank to form a dropframe vehicle framework integral therewith.

9. An offset tank having bracing means comprising internal longitudinally extending stiffening members integral therewith and external longitudinally extending stiffening members integral therewith, said stiffening members being offset to correspond with the offset in said tank.

10. In a tank, a shell portion, transverse sheets, said sheets having extensions beyond said shell portion, longitudinally extending bracing means within said tank connecting said sheets, and longitudinally extending bracing means connecting said extensions, whereby a vehicle framework integral with said tank is provided.

11. In a tank, a shell portion, transverse sheets, said sheets having extensions beyond said shell portion, longitudinally extending bracing means within said tank connecting said sheets, said bracing means comprising tubular members, and longitudinally extending bracing means connecting said extensions, whereby a vehicle framework integral with said tank is provided.

12. In a tank, a shell portion, transverse sheets, said sheets having extensions beyond said shell portion, longitudinally extending bracing means within said tank shell portion connecting said sheets, said bracing means comprising substantially vertically extending web portions, and longitudinally extending bracing means externally of said shell portion connecting said extensions, whereby a vehicle framework integral with said tank is provided.

13. In a tank, a shell portion, transverse sheets, said sheets having extensions beyond said shell portion, longitudinally extending bracing means within said tank connecting said sheets, said bracing means comprising tubular members and web portions extending from said tubular members to said shell, and longitudinally extending bracing means connecting said extensions, whereby a vehicle framework integral with said tank is provided.

14. In a tank, a shell portion, transverse sheets, said sheets having extensions beyond said shell portion, longitudinally extending bracing means within said tank connecting said sheets, said bracing means comprising tubular members and cross braces connecting the same, and longitudinally extending bracing means connecting said extensions, whereby a vehicle framework integral with said tank is provided.

15. A tank of the character described having bracing means comprising transverse and longitudinally extending members both externally and internally of said tank connected to form a framework integral therewith.

16. In a tank, a shell portion, transverse sheets, said sheets having extensions beyond said shell portion, longitudinally extending bracing means within said tank connecting said sheets and longitudinally extending bracing means connecting said extensions, whereby a vehicle framework integral with said tank is provided, said shell portion being offset and said longitudinally extending bracing means being correspondingly offset.

17. A tank of the character described having bracing means comprising transverse and longitudinally extending members both externally and internally of said tank connected to form a framework integral therewith, said longitudinally extending members being offset to provide a drop frame.

18. A tank having a transversely curved body portion having its longitudinal axis extending substantially horizontally and an inverted channeled member secured to the top of said tank to said curved body portion and running lengthwise thereof, to provide a walkway on top of said tank and brace said tank.

19. In a vehicle tank, a tubular shell portion, longitudinally extending bracing means within said shell portion and longitudinally extending bracing means externally of said shell portion in substantial alignment with said first mentioned bracing means, said bracing means being secured respectively to the inner and outer faces of said shell portion and said shell portion providing an unbroken wall portion at said bracing means.

20. In a vehicle tank, a shell portion having an offset in the bottom thereof, heads, partitions extending transversely of said tank and tubular bracing members extending lengthwise of said tank from end to end thereof and secured to said heads and partitions, said bracing members being spaced a substantial distance from said bottom and being straight from end to end of said tank.

21. In a tank vehicle, an axle, wheels carried thereby, springs supported on said axle, a tank having an offset therein to provide a main body portion and a reduced end portion upwardly offset on the under side thereof from said main body portion and an integral combined tank bracing means and vehicle frame mounted directly on said springs and forming a unit with said tank, said bracing means comprising longitudinally extending members upwardly offset at the offset in said tank.

22. In a tank vehicle, spaced wheeled supporting means, a tank offset below a supported end thereof and a combination vehicle frame and tank bracing means comprising longitudinal bracing means rigid with said tank mounted directly on said supporting means, said tank and its bracing means being the sole connection between said supporting means.

In testimony whereof, I hereunto subscribe my name this 11th day of April, 1927.

ANDREW A. KRAMER.